United States Patent
Morishita et al.

Patent Number: 5,506,179
Date of Patent: Apr. 9, 1996

[54] CERAMICS BINDER MIXTURE AND BINDING METHOD

[75] Inventors: Tomohiro Morishita, Handa; Hiroshi Ueda, Takasago; Yasuhiko Endo, Tokyo, all of Japan

[73] Assignee: Asahi Glass Company Ltd., Tokyo, Japan

[21] Appl. No.: 309,887

[22] Filed: Sep. 20, 1994

[30] Foreign Application Priority Data

Sep. 20, 1993 [JP] Japan ................................. 5-233247

[51] Int. Cl.$^6$ .................... C04B 35/18; C04B 35/195
[52] U.S. Cl. ........................... 501/9; 501/118; 501/119; 252/315.5
[58] Field of Search ............................ 501/9, 119, 122, 501/120, 133, 153, 154, 118; 252/315.6, 315.7, 315.5

[56] References Cited

U.S. PATENT DOCUMENTS

| | | | |
|---|---|---|---|
| 4,257,810 | 3/1981 | Narumiya | 501/153 |
| 4,367,292 | 1/1983 | Sano et al. | 501/153 |
| 4,584,003 | 4/1986 | Oda et al. | |
| 5,045,514 | 9/1991 | Ismail et al. | 501/153 |
| 5,073,178 | 12/1991 | Mimori et al. | |

FOREIGN PATENT DOCUMENTS

| | | |
|---|---|---|
| 57-20269 | 4/1982 | Japan . |
| 3192176 | 8/1991 | Japan . |
| 0042840 | 1/1992 | Japan . |

OTHER PUBLICATIONS

"Porous Ceramic For Adsorption of Soils" Yokoyama et al., JP01-61368 (Jun. 15, 1989).

*Primary Examiner*—Paul Marcantoni
*Attorney, Agent, or Firm*—Oblon, Spivak, McClelland, Maier, & Neustadt

[57] ABSTRACT

A ceramics binder mixture having from 4.3 to 7 parts by weight, as calculated as silica, of a silica-sol mixed to 100 parts by weight of a mixture comprising (1) from 25 to 60 parts by weight of cordierite aggregates prepared by melting and vitrifying a mixture of an approximate cordierite composition ($2MgO.2Al_2O_3.5\%SiO_2$), followed by crystallization to cordierite, and having a particle size of from 0.1 to 1 mm, (2) from 6 to 17 parts by weight of a fine powder of silica having particle sizes of from 0.1 to 10 μm, and (3) the rest being a powder composed mostly of cordierite particles and having particle sizes smaller than 0.1 mm, whereby the $Na_2O$ content in the binder mixture excluding moisture is not higher than 0.3 wt %.

3 Claims, 1 Drawing Sheet

CERAMICS BINDER MIXTURE AND BINDING METHOD

BACKGROUND OF THE INVENTION

1. Field of the Invention

The present invention relates to a ceramics binder mixture suitable for binding low thermal expansion cordierite ceramics or the like, and a binding method wherein this ceramics binder mixture is used.

2. Discussion of Background

As binder mixtures useful for binding ceramics of the same or different kinds to be used at high temperatures, various binder mixtures are commercially available depending upon the particular purposes and applications. Such binder mixtures include those which utilize hardening of cement, those which utilize solidification by a dehydrating condensation reaction of an alkali metal silicate solution and those which utilize solidification by a dehydrating condensation reaction of a phosphate solution.

Usually, such binder mixtures comprise a binder component to provide binding strength, a filler to reduce the difference in the average thermal expansion coefficient between the binding layer and the material to be bound and to reduce the shrinkage of the binding layer upon drying, a plasticizer to improve the workability of the composition, and additives to adjust the dispersibility or the hardening rate of the binder mixture. However, there has been no ceramics binder mixture which is reliable and which has practical binding strength up to a high temperature range exceeding 600° C.

The present inventors have previously proposed in U.S. Pat. No. 5,073,178 a filter tube made of a low thermal expansion cordierite ceramics having a high porosity and practical strength even at a high temperature of exceeding 600° C., as a filter for removing dust from a high temperature dust-containing gas. U.S. Pat. No. 4,584,003 proposes a filter apparatus provided with a filter tube of such a type. Further, Japanese Examined Patent Publication No. 20269/1982 proposes a process for producing low thermal expansion cordierite aggregates used as the main material of the cordierite ceramics filter as disclosed in U.S. Pat. No. 5,073,178. In the process for producing cordierite aggregates, a mixture material having an approximate cordierite composition ($2MgO.2Al_2O_3.5SiO_2$) is melted; the melt is rapidly cooled to obtain glass particles, and the glass particles are heated again for crystallization to cordierite.

The cordierite aggregates prepared by this process and a cordierite ceramics prepared by sintering the cordierite aggregates, have a characteristic such that the mean thermal expansion coefficients between room temperature and 1,000° C. (hereinafter referred to simply as a mean thermal expansion coefficient) can be made to be not more than $20 \times 10^{-7}$/°C. with good reproducibility, even if the cordierite crystals have no orientation i.e. even without molding by extrusion to form a thin walled honeycomb structure, while the mean thermal expansion coefficient of usual cordierite ceramics is from $22 \times 10^{-7}$/°C. to $26 \times 10^{-7}$/°C.

The cordierite filter tube which can be produced by the process disclosed in U.S. Pat. No. 5,073,178, is limited in its length for a practical reason. For example, it is difficult to produce a filter tube having a length of 1 m, since such a tube is likely to undergo deformation by its own weight during the firing step. Yet, it is advantageous to use long filter tubes, when the economy of the filter apparatus for removing dust from a high temperature dust-containing gas is taken into consideration. Therefore, a long filter tube having plural (e.g. three) elemental filter tubes of a short length (e.g. 710 mm) bound to one another, is practically used. In such a case, to secure the reliability of the filter tube, it is essential that the bound areas of the filter tube have sufficient binding strength and reliability. Namely, it is essential that the bound areas will not be damaged by the mechanical shock exerted at the time of mounting the filter tube to the filter apparatus, by the thermal shock or thermal stress due to the temperature rise and drop of the high temperature dust-containing gas to be treated, and by a stress caused by e.g. vibration during its use.

For binding elemental filter tubes, using a cylindrical joint made of cordierite ceramics, various conventional ceramics binder mixtures including commercial products have been tried, but with conventional binder mixtures, it has been impossible to obtain sufficient and reliable binding strength. Namely, with conventional binder mixtures, the binding layers of the mixtures undergo cracking due to shrinkage resulting from drying or solidification, and constant binding strength can hardly be obtained due to fluctuation in strength. Further, when at least one of the objects to be bound is porous, the liquid component in the binder mixture tends to penetrate into the object to be bound, and cracks are likely to form at the boundary between the binding layer and the object to be-bound, whereby it has been difficult to obtain sufficient and reliable binding strength.

Further, Japanese Unexamined Patent Publication No. 192176/1991 discloses a binder mixture useful for binding a cordierite ceramics comprising cordierite aggregates and fumed silica. However, the mixture contains sodium silicate and thus has a problem that the $Na_2O$ component reacts with the cordierite aggregates at a high temperature, whereby the cordierite aggregates undergoes a property change, and the mean thermal expansion coefficient of the cordierite aggregates or the ceramics containing the aggregates, will increase, and the binding strength at a high temperature will be low.

SUMMARY OF THE INVENTION

It is an object of the present invention to overcome the above-mentioned problems of the prior art and to provide a reliable ceramics binder mixture which is capable of maintaining sufficient binding strength even when the service temperature exceeds 600° C. and the binding layer formed by solidification of the binder mixture has a low thermal expansion coefficient and free from formation of cracks in the binding layer during the drying or heating, and to provide a method for binding a cordierite ceramics by such a binder mixture.

The present invention has been accomplished to achieve the above objects, and it provides a ceramics binder mixture having from 4.3 to 7 parts by weight, as calculated as silica, of a silica-sol mixed to 100 parts by weight of a mixture comprising (1) from 25 to 60 parts by weight of cordierite aggregates prepared by melting and vitrifying a mixture of an approximate cordierite composition ($2MgO.2Al_2O_3.5SiO_2$), followed by crystallization to cordierite, and having particle sizes of from 0.1 to 1 mm, (2) from 6 to 17 parts by weight of a fine powder of silica having particle sizes of from 0.1 to 10 μm, and (3) the rest being a powder composed mostly of cordierite particles and having particle sizes smaller than 0.1 mm, whereby the $Na_2O$ content in the binder mixture excluding moisture is not higher than 0.3 wt %.

DETAILED DESCRIPTION OF THE PREFERRED EMBODIMENTS

Figure 1:
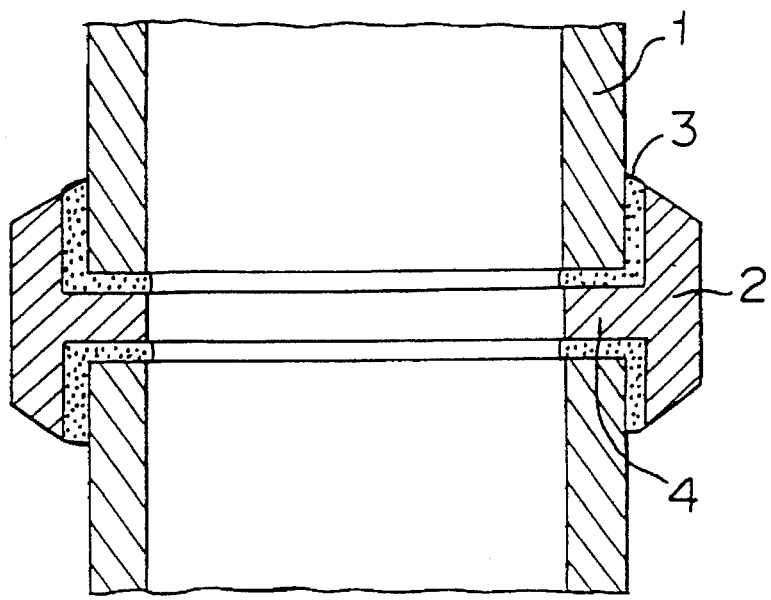
FIG. 1 is a partial cross-sectional view of filter tubes bound by the binding method of the present invention by means of the ceramics binder mixture of the present invention.

Cordierite aggregates crystallized from a glass and having particle sizes of at least 0.1 mm, have a mean thermal expansion coefficient smaller than the mean thermal expansion coefficient of conventional cordierite aggregates. The mean thermal expansion coefficient of the binding layer made of the ceramics binder mixture of the present invention is reduced by incorporating at least 25 parts by weight of the cordierite aggregates having the particle sizes of from 0.1 to 1 mm to the mixture. Then, the difference in the thermal expansion can be reduced between the binding layer and the ceramics to be bound and used at a high temperature, such as a low thermal expansion ceramics. Accordingly, it is possible to reduce the thermal stress formed between the binding layer and the ceramics to be bound and thus to avoid formation of cracks in the binding layer and in the vicinity thereof.

Further, since the cordierite aggregates having particle sizes of from 0.1 to 1 mm are contained in an amount of 25 parts by weight in the mixture, the shrinkage of the binding layer due to drying and solidification as well as the shrinkage upon heating will be reduced, whereby it is possible to suppress formation of cracks in the binding layer. Furthermore, the cordierite aggregates crystallized from the glass are dense, whereby the cordierite aggregates have high strength, and it is possible to obtain a bound body having high strength.

Further, the porosity of the cordierite aggregates is usually as low as not higher than 0.5%, and the cordierite aggregates show no substantial water adsorption. Accordingly, the amount of water to be added to the binder mixture may be small, whereby the time required for drying after application can be shortened. The particle sizes of the cordierite aggregates are not larger than 1 mm. If the particle sizes of the aggregates are large, it tends to be difficult to fill the binder mixture into a narrow space such as a space having a width of about 2 mm.

The content of the cordierite aggregates in the mixture is not more than 60 parts by weight. If the content exceeds 60 parts by weight, the flowability and plasticity of the binder mixture having water added thereto, will be poor, whereby the workability will be impaired. Taking into consideration the binding operation efficiency and the reliability of the binding layer to be formed, the content of the cordierite aggregates having particle sizes of from 0.1 to 1 mm, is preferably from 30 to 50 parts by weight in 100 parts by weight of the mixture.

For the binder mixture of the present invention, cordierite aggregates crystallized from a glass being dense (porosity being not higher than 0.5%) and having a low mean thermal expansion coefficients are used which can be produced by the process proposed in Japanese Examined Patent Publication No. 20269/1982. According to the method for producing cordierite aggregates subsequently proposed in Japanese Patent Application No. 219033/1993 (U.S. patent application Ser. No. 08/289,280), it is possible to obtain cordierite aggregates having a still lower mean thermal expansion coefficient ($10 \times 10^{-7}$/°C. or lower) by crystallizing clean glass particles having particle sizes of at least of 1 mm which are substantially free from defects serving as crystal nuclei, such as carbon or other impurities, or lattice defects.

Such low thermal expansion cordierite aggregates are not only useful as starting materials for binder mixtures but also suitable four use as the main materials for cordierite filters for removing dust from high temperature gasses. By incorporating such cordierite aggregates having low mean thermal expansion coefficients, it is possible to obtain binder mixtures suitable for binding cordierite filters for high temperature dust containing gasses, whereby the mean thermal expansion coefficient of the binding layer by such binder mixture will be as low as not higher than $19 \times 10^{-7}$/°C. or not higher than $13 \times 10^{-7}$/°C.

The particle sizes of the fine powder of silica incorporated are from 0.1 to 10 μm, whereby proper flowability and plasticity will be imparted to the binder mixture at the time of the application, and the workability of the binder mixture will be good. Furthermore, due to the incorporation of the fine powder of silica, the binder mixture will show good wettability to the surface of the objects to be bound, and the binder mixture is readily penetrable into small dents on the surface of the objects to be bound, whereby large binding strength can be obtained.

The fine powder of silica is preferably fumed silica. The particles of fumed silica are fine and approximately spherical. It is believed attributable to the effects of addition of such characteristic fine particles that preferable properties such as flowability, dispersibility and plasticity can be imparted to the binder mixture by an addition of a relatively small amount of water.

The content of the fine powder of silica in 100 parts by weight of the mixture is from 6 to 17 parts by weight. If the content is less than 6 parts by weight, the dispersibility or the plasticity of the binder mixture tends to be poor, and it tends to be difficult to form a thick binding layer. If it exceeds 17 parts by weight, the viscosity of the binder mixture tends to be too high that the filling operation for binding will be difficult. Further, if the amount of the fine powder of silica is too much, the shrinkage due to drying or solidification will increase, cracks tend to form in the binding layer, and the average thermal expansion coefficient of the binding layer tends to increase.

In the binder composition, the silica-sol is incorporated in an amount of from 4.3 to 7 parts by weight as calculated as silica, per 100 parts by weight of the mixture. If the amount is less than 4.3 parts by weight, the strength of the binding layer after solidification tends to be low. On the other hand, if it exceeds 7 parts by weight, the viscosity of the binder mixture tends to be low due to a large amount of water added together with the silica-sol, whereby the liquid component and the aggregates in the binder composition tend to separate by gravity during the binding operation, whereby the binding layer tends to be non-uniform, the strength of the binding layer tends to be low, and cracks are likely to be formed in the binding layer during the drying operation. A silica-sol containing from 20 to 35 wt % of silica is commercially available as a product produced from water glass as a starting material. Such a silica-sol has a proper viscosity and is suitable to impart proper flowability and viscosity to the binder mixture and to secure the workability, and when dehydrated and solidified, it serves to impart binding strength to the binding layer. As the silica-sol, the one obtained by hydrolyzing an alkoxide, such as ethyl silicate, can also be preferably used.

The viscosity and the plasticity may be adjusted also by incorporating an organic binder to the binder mixture. For example, the flowability of the binder mixture can be adjusted by incorporating a small amount of e.g. methyl cellulose, whereby dripping of the binder mixture from the applied portion can be prevented at the time of the application.

As the rest, a powder composed mostly of cordierite particles, having particle sizes smaller than 0.1 mm, is added to the binder mixture for the purposes of filling spaces of the above-mentioned cordierite aggregates to increase the packing density of the particles in the dried and solidified binding layer of the binder mixture and to secure the strength of the binding layer. As such a cordierite powder, a commercially available powder prepared from usual clay minerals, may be used. However, it is preferred to use the one obtained by pulverizing a cordierite aggregates crystallized from a glass and having a low porosity. In such a case, it is possible to obtain a binder mixture capable of forming a binding layer having a smaller mean thermal expansion coefficient, being highly dense and presenting high binding strength. Further, it is possible to improve the plasticity or the workability of the binder mixture by substituting a part, for example, at most 6 parts by weight, of the cordierite powder by clay. The $Na_2O$ content in the binder mixture excluding water is not higher than 0.3 wt %. If the content of $Na_2O$ is higher than 0.3 wt %, it will react with the cordierite aggregates at a high temperature to degenerate the cordierite aggregates to increase the mean thermal expansion coefficient, such being undesirable. Further, $Na_2O$ may sometimes react with silica to form a phase having a large mean thermal expansion coefficient and a low melting point. The content of $Na_2O$ in the binder mixture excluding water, is preferably not higher than 0.15 wt % in order to maintain the mean thermal expansion coefficient of the binding layer at a low level and to secure high temperature strength of the binding layer.

When cordierite filter tubes to be used for removal of dust from a high temperature dust containing gas such as a combustion gas of a pressurized fluidized bed combustion boiler or a synthesized gas of a coal gasifier, are to be joined, the filter tubes will be exposed to severe thermal shocks repeatedly. Therefore, the mean thermal expansion coefficient of the cordierite filter tubes is preferably not higher than $18\times10^{-7}/°C.$, more preferably not higher than $13\times10^{-7}/°C.$ to avoid damages by thermal stresses. Such low thermal expansion cordierite filter tubes can be produced by forming a sintered body containing at least 50 wt % of the above-mentioned cordierite aggregates having a particularly low mean thermal expansion coefficient.

Further, the mean thermal expansion coefficient of the binding layer formed by drying and solidifying the binder mixture used for binding cordierite filter tubes having a low mean thermal expansion coefficient, is required to be close to the mean thermal expansion coefficient of the cordierite filter tubes to be bound, and it is possible to avoid formation of cracks due to thermal stress formed between the solidified binding layer and the bound filter tubes due to the difference in the thermal expansion. The absolute value of the difference in the mean thermal expansion coefficient between the solidified binding layer and the objects to be bound, is preferably not higher than $4\times10^{-7}/°C.$ With cordierite filter tubes, the porosity is at least 30% to secure good filter performance i.e. gas permeability, whereby the water absorption is high. Therefore, in order to prevent penetration of the liquid component of the binder mixture into the filters to be bound, it is necessary to adjust the binder mixture to have a proper viscosity. For this purpose, it is preferred to adjust the amount of the silica-sol or to add an organic binder such as methyl cellulose so as to prevent penetration of the liquid component of the binder mixture into the objects to be bound.

The lower the viscosity of the liquid component contained in the binder mixture, the better the wettability with the surface of the objects to be bound, and the higher the resulting binding strength. However, if the viscosity is low, the liquid component of the binder mixture is likely to be absorbed by the objects to be bound, whereby the viscosity and the plasticity of the binder mixture will change, and the filling operation will be difficult. Especially when objects having different porosities are to be bound, it is desired to adjust the binder mixture, for example, by an addition of an organic binder, so that the liquid component and the binder mixture have proper viscosities and plasticities.

Further, when objects having high porosities are to be bounded, it is preferred to preliminarily coat or impregnate a silica-sol to the objects to be bound, so that absorption of the liquid component of the binder mixture into the objects to be bound, can be suppressed. However, if the viscosity of the silica-sol to be coated or impregnated, is too low, the silica-sol tends to penetrate into an unnecessary portion (or depth). Accordingly, it is preferred to coat or impregnate a silica-sol having a proper viscosity containing from 20 to 35 wt % of colloidal silica, just like the silica-sol to be incorporated to the binder mixture.

The method for binding filter tubes of the present invention comprises a method for binding filter tubes, which comprises (1) disposing, at a position where two filter tubes made of a cordierite ceramics which contains at least 50 wt % of cordierite aggregates prepared by melting and vitrifying a mixture of an approximate cordierite composition ($2MgO.2Al_2O_3.5SiO_2$) followed by crystallization to cordierite, and having particle sizes of at least 0.1 mm, and which have porosities of at least 30%, are to be bound, a cylindrical joint made of a cordierite ceramics which contains at least 50 wt % of a cordierite aggregates prepared by melting and vitrifying a mixture of an approximate cordierite composition, followed by crystallization to cordierite, and having particle sizes of at least 0.1 mm, and which has a porosity lower by 5% than the filter tubes, and having a ring-shaped projection provided on its inside, (2) fitting the two filter tubes to the cylindrical joint so that the ring-shaped projection is sandwiched by end surfaces of the two filter tubes, (3) filling the space between the cylindrical joint and the filter tubes with a ceramics binder mixture comprising, as main components, silica and aggregates prepared by crystallizing a glass having an approximate cordierite composition, and (4) solidifying the ceramics binder mixture.

The filter tubes containing at least 50 wt % of low thermal expansion cordierite aggregates crystallized from a glass and having particle sizes of at least 0.1 mm, are low thermal expansion filter tubes excellent in high temperature strength. However, for the above-mentioned practical reason, it is difficult to produce them as long length products. Therefore, they can provide good practical performance for the first time when a binding method has been established whereby sufficient strength can be maintained in the bound product even at a high temperature.

The cylindrical joint to be attached at the joint area of the cordierite filter tubes, is required to have a mean thermal expansion coefficient which is close to the mean thermal expansion coefficient of the filter tubes, in order to avoid cracking due to the difference in the thermal expansion between the cylindrical joint and the filter tubes. For this purpose, the cylindrical joint is prepared by a sintered body containing at least 50 wt % of cordierite aggregates crystallized from a glass and having particle sizes of at least 0.1 mm, so that the mean thermal expansion coefficient of the cylindrical joint will be small. Further, the porosity of the cylindrical joint is made lower by at least 5% than the filter tubes to increase the strength of the cylindrical joint to secure the strength of the joint area.

A ring-shaped projection is provided on the inside of the cylindrical joint, and the filter tubes are joined so that the ring-shaped projection is sandwiched by the ends of the respective filter tubes, so that the position of the cylindrical joint will not be displaced from the joint area of the filter tubes. Further, even when the end surface of one of the filter tubes has a certain slant, it is thereby possible to prevent a possibility that a compression stress which is likely to cause breakage, will be exerted to the end surface of the other filter tube, and a wide binding surface area by the binder mixture can be secured, whereby a highly reliable bound product will be obtained.

It is preferred to have a space of about 3 mm between the inner wall of the cylindrical joint and the outer circumference of the filter tubes, when the filter tubes are fitted to the cylindrical joint. Binding of the filter tubes is carried out by filling the binder mixture in the space between the cylindrical joint and the outer circumference of the filter tubes and solidifying it.

For binding the filter tubes, it is preferred to use the above-mentioned binder mixture of the present invention. By minimizing the difference in the thermal expansion among the mean thermal expansion coefficients of the filter tubes, the cylindrical joint and the binding layer formed by the binder mixture, it is possible to avoid formation of cracks at the joint area, and it is possible to obtain bound cordierite filter tubes having high binding strength with small deviation.

If a silica-sol is preliminarily coated on or impregnated in both the cylindrical joint and the ends of the filter tubes, it is possible to prevent penetration of the liquid component of the binder mixture into pores of the cylindrical joint and the filter tubes, whereby the viscosity or the flowability of the binder mixture coated on or filled in the joint area will not change so that the operation of filling the binder mixture into the space will be easy, and the wettability between the binder mixture and the objects to be bound, will be improved so that a reliable bound product can be obtained.

As the silica-sol preliminarily coated on or impregnated in the portions to be bound, it is preferred to use the same silica-sol as the one incorporated to the binder mixture. A silica-sol containing from 20 to 35 wt % of colloidal silica has a proper viscosity and does not penetrate into unnecessary portions in the filter tubes or in the cylindrical joint, and thus it is suitable for use.

By adjusting the mean thermal expansion coefficients of the filter tubes to be bound and the cylindrical joint to be used to a level of not higher than $18\times10^{-7}/°C.$, preferably not higher than $13\times10^{-7}/°C.$, it is possible to obtain a long, reliable cordierite bound filter tube which is suitable for removal of dust from a high temperature gas and which is easy to use and durable against vigorous up and down of the temperature, and the function of the cordierite filter tube having a small mean thermal expansion coefficient can fully be utilized.

Now, the present invention will be described in further detail with reference to Examples. However, it should be understood that the present invention is by no means restricted to such specific Examples.

FIG. 1 is a partial cross-sectional view showing an embodiment of the binding method of the present invention wherein the ceramics binder mixture of the present invention is used to bind cordierite filter tubes. In the figure, reference numeral 1 indicates a cordierite filter tube, 2 a cylindrical joint, a binding layer, and 4 a ring-shaped projection.

The size of the elemental filter tube is, for example, such that the outer diameter is 170 mm, the inner diameter is 140 mm, and the length is 710 mm. The porosity was about 40%, and the mean pore diameter (the volume average pore diameter as measured by a mercury porosity with respect to a dice-like test piece of about 1 cm$^3$) was about 50 μm. In a case when a filter tube is used for removing fine dust, it is recommended to form a small-pore sized filter layer at least on the filtering surface of the filter tube. Further, the cylindrical joint had an outer diameter of 194 mm, an inner diameter of 176 mm and a height of 70 mm, with a ring-shaped projection having an inner diameter of 140 mm and a thickness of 10 mm.

The filter tubes subjected to tests, were sintered bodies containing 60 wt % of cordierite aggregates crystallized from a glass of a cordierite composition and having particle sizes of at least 0.1 mm, and they have a mean thermal expansion coefficient of $16\times10^{-7}/°C.$, a bending strength at room temperature of 160 kg/cm$^2$ and a bending strength at 800° C. of about 100 kg/cm$^2$. Further, the cylindrical joint was a sintered body containing 60 wt % of cordierite aggregates crystallized from a glass of a cordierite composition and having particle sizes of at least 0.1 mm, and its porosity was 17%, and the mean thermal expansion coefficient was $17\times10^{-7}/°C.$

EXAMPLE 1

Glass particles having a cordierite composition were crystallized at 1,400° C. to obtain cordierite aggregates. This cordierite aggregates had a mean thermal expansion coefficient of about $15\times10^{-7}/°C.$ and a porosity of about 0.3%. The obtained aggregates were crushed and then classified to obtain aggregates having particle sizes of from 0.1 to 1 mm and a powder having particle sizes of less than 0.1 mm. To 100 parts by weight of a mixture comprising 45 parts by weight of the aggregates having particle sizes of from 0.1 to 1 mm, 43 parts by weight of the powder having particle sizes of less than 0.1 mm, 2 parts by weight of clay and 10 parts by weight of fumed silica having particle sizes of from 0.1 to 10 μm, 18 parts by weight of a commercially available silica-sol containing 30 wt % of colloidal silica (5.4 parts by weight as calculated as silica) and 0.02 part by weight of methyl cellulose (an organic binder) were added and mixed to obtain a ceramics binder mixture. Na$_2$O contained in this binder mixture excluding moisture was not more than 0.1 wt %.

Two cordierite elemental filter tubes were bound by a cylindrical joint 2 and the binder mixture in such an order that firstly one elemental filter tube 1 was joined to one side of the cylindrical joint 2 and then the other elemental filter tube 1 was joined to the other side of the cylindrical joint 2, to obtain a bound filter tube as shown in FIG. 1.

Namely, firstly, the above-mentioned silica-sol containing 30 wt % of colloidal silica was coated on the binding surfaces of one elemental filter tube 1 and one side of the cylindrical joint 2. Then, the above-mentioned binder mixture 3 was applied to the binding surface on the inside of the cylindrical joint having the silica-sol coated thereon, and the first elemental filter tube was fitted in the cylindrical joint. Then, the binder mixture 3 was filled into the space between the two, so that no air blister would remain.

The assembly was left to stand for one day at room temperature and then dried in a drying chamber at 100° C. for 3 hours. Then, a second elemental filter tube 1 was fitted into the other side of the cylindrical joint 2 in the same manner, and the binder mixture 3 was likewise filled. The assembly was again left to stand for one day at room temperature and then dried in a drying chamber at 100° C. for 3 hours. Then, the bound body of the filter tubes was put in an electric furnace maintained at 600° C., and heated for 9 hours to solidify the binder mixture. The binding layer and the vicinity thereof (hereinafter generally referred to as the joint area) of the obtained bound body of filter tubes, were inspected, whereby no visually detectable cracks were observed.

A test of exerting a load of 100 kg at the joint area of the bound filter tubes disposed in a transverse direction with both ends of the bound filter tube supported, and a tensile test of suspending a load of 100 kg from the lower end of the bound filter tube held in a vertical direction, were carried out, whereby no change was observed at the joint area of the filter tubes.

Further, a heat shock test of putting the obtained bound filter tube in an electric furnace kept at 400° C. for two hours, then withdrawing and cooling it, was repeated a total of ten times, whereby no cracks were observed at the joint area. Further, the bound filter tube was put into an electric furnace, heated to 1,000° C. at a temperature raising rate of 200° C./hr, maintained at 1,000° C. for 3 hours, then cooled in the furnace and withdrawn, whereby no visually detectable cracks were observed at the joint area.

cordierite powder, a commercial product synthesized from clay and talc, was used, and in Examples 20 to 22, as the cordierite aggregates and the cordierite powder, commercial products prepared from clay and talc as the starting material (porosity of the aggregate was about 18%, those identified with symbol * in Table 3) were used. The amount of $Na_2O$ contained in the dried binder mixture was not higher than 0.05 wt % in Examples 2 to 18, about 0.12 wt % in Example 19 and about 0.32 wt % in Examples 20 to 22. The mean thermal expansion coefficients of the solidified products of the binder mixtures as identified in Tables 1 to 3, were measured with respect to samples fired at 1,300° C. in all cases.

Figure 2:
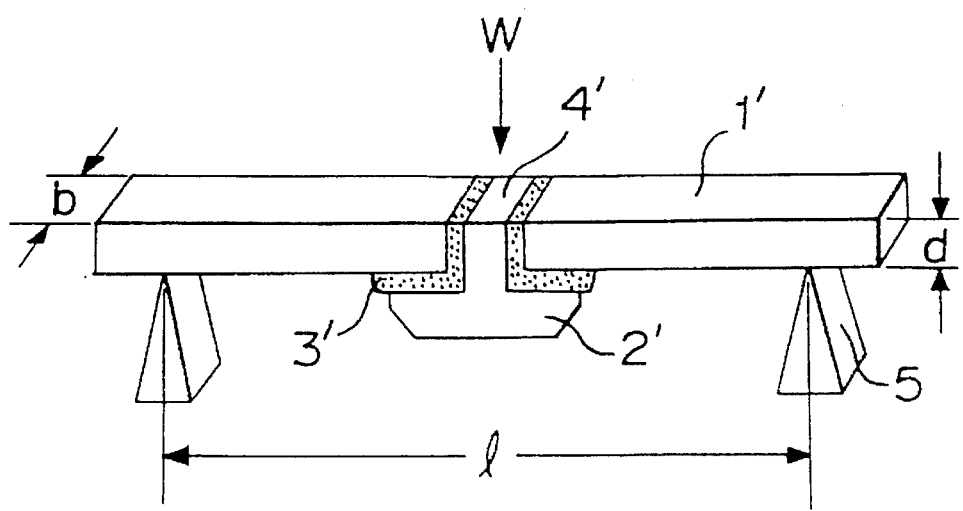
FIG. 2 is a perspective view for illustrating the method for evaluating binding strength by means of a test specimen prepared from the bound filter tubes.

The joint area of each bound filter tubes solidified by heating at 600° C., was cut to obtain five bending test specimens as shown by a perspective view in FIG. 2, and a three point bending strength was measured to evaluate the binding strength of the joint area. In FIG. 2, reference numeral 1' indicates the cut filter tube, 2' the cut cylindrical joint, 3' the binding layer, 4' the projection of the cylindrical joint, and 5 supporting points for measuring the bending strength.

The bending strength of the joint area was determined by obtaining the breaking strength $\sigma$ in accordance with the formula $\sigma=3Wl/2bd^2$ where d is the thickness of the bending test specimen, b is the width of the specimen, l is the supporting span, and W is the breaking load. Data showing a substantial deviation in the bending strength, were identified with symbol #. The reason for the substantial deviation is believed to be attributable to fine cracks formed in the joint area. With respect to some test specimens, the bending strengths at 900° C. were investigated, whereby it was found that bending strength at a level of from 80 to 100% of the room temperature bending strength of the joint area were secured.

TABLE 1

| | Examples | | | | | | |
|---|---|---|---|---|---|---|---|
| | 2 | 3 | 4 | 5 | 6 | 7 | 8 |
| Cordierite aggregate | 10 | 20 | 30 | 40 | 50 | 60 | 70 |
| Cordierite powder | 78 | 68 | 58 | 48 | 38 | 28 | 18 |
| Clay | 2 | 2 | 2 | 2 | 2 | 2 | 2 |
| Fumed silica | 10 | 10 | 10 | 10 | 10 | 10 | 10 |
| Silica-sol | 23 | 21 | 20 | 19 | 18 | 17 | 17 |
| Methyl cellulose (parts by weight) | 0.02 | 0.02 | 0.02 | 0.02 | 0.02 | 0.02 | 0.02 |
| Properties of the binder mixture | | | | | | | |
| Shrinkage upon solidification at 600° C. for 9 hrs. | 4.2 | 3 | 2 | 0.8 | 0.5 | 0.5 | 0 |
| Shrinkage upon baking at 1,300° C. for 5 hrs. | — | — | — | 1.1 | — | — | — |
| Mean thermal expansion coefficient × $10^{-7}$/°C. | 21 | 20 | 18 | 17 | 16 | 15 | 15 |
| Binding tests | | | | | | | |
| Application of silica-sol: | | | | | | | |
| Filter tubes | Yes | Yes | Yes | Yes | Yes | Yes | Yes |
| Cylindrical joint | Yes | Yes | Yes | Yes | Yes | Yes | Yes |
| Workability | Good | Good | Good | Good | Good | Fair | No good |
| Cracks after solidification at 600° C. | Yes | Yes | No | No | No | No | No |
| Bending strength after solidification (kg/cm$^2$) | — | 53# | 72 | 126 | 132 | 114 | 65 |
| Overall evaluation | No good | No good | Good | Excellent | Excellent | Excellent | Fair |

EXAMPLES 2 TO 22

Ceramics binder mixtures having various formulations as identified in Tables 1 to 3, were prepared. Using these binder mixtures, bound bodies of elemental filter tubes of the same type as in FIG. 1, were obtained. In Example 19, as the

TABLE 2

| | Examples | | | | | | |
|---|---|---|---|---|---|---|---|
| | 9 | 10 | 11 | 12 | 13 | 14 | 15 |
| Cordierite aggregate | 80 | 40 | 40 | 40 | 40 | 40 | 40 |
| Cordierite powder | 8 | 48 | 48 | 48 | 48 | 48 | 48 |
| Clay | 2 | 2 | 2 | 2 | 2 | 2 | 2 |
| Fumed silica | 10 | 0 | 5 | 15 | 20 | 10 | 10 |
| Silica-sol | 15 | 17 | 18 | 19 | 20 | 14 | 16.5 |
| Methyl cellulose (parts by weight) | 0.02 | 0.02 | 0.02 | 0.02 | 0.02 | 0.02 | 0.02 |
| Properties of the binder mixture | | | | | | | |
| Shrinkage upon solidification at 600° C. for 9 hrs. | 0 | 0.2 | 0.4 | 1 | 2.4 | — | 0.6 |
| Shrinkage upon baking at 1,300° C. for 5 hrs. | — | — | — | — | — | — | — |
| Mean thermal expansion coefficient × $10^{-7}$/°C. | — | 16 | 16 | 18 | 22 | — | — |
| Binding tests | | | | | | | |
| Application of silica-sol: | | | | | | | |
| Filter tubes | Yes | No | Yes | Yes | No | No | Yes |
| Cylindrical joint | Yes | No | Yes | Yes | No | No | Yes |
| Workability | No good | No good | Fair | Good | No good | No good | Fair |
| Cracks after solidification at 600° C. | — | — | No | No | No | No | No |
| Bending strength after solidification (kg/cm$^2$) | — | — | 47 | 121 | — | — | 73 |
| Overall evaluation | No good | No good | Fair | Excellent | No good | No good | Good |

TABLE 3

| | Examples | | | | | | |
|---|---|---|---|---|---|---|---|
| | 16 | 17 | 18 | 19 | 20 | 21 | 22 |
| Cordierite aggregate | 40 | 40 | 40 | 40 | 40* | 40* | 40* |
| Cordierite powder | 48 | 48 | 48 | 48* | 48* | 48* | 48* |
| Clay | 2 | 2 | 2 | 2 | 2 | 2 | 2 |
| Fumed silica | 10 | 10 | 10 | 10 | 10 | 10 | 10 |
| Silica-sol | 21.5 | 24 | 26 | 20 | 20 | 19 | 19 |
| Methyl cellulose (parts by weight) | 0.02 | 0.02 | 0.02 | 0.02 | 0.02 | 0.02 | 0.02 |
| Properties of the binder mixture | | | | | | | |
| Shrinkage upon solidification at 600° C. for 9 hrs. | 2.1 | 3.3 | — | 2.5 | 1 | — | — |
| Shrinkage upon baking at 1,300° C. for 5 hrs. | — | — | — | — | 4.7 | — | — |
| Mean thermal expansion coefficient × $10^{-7}$/°C. | — | — | — | 19 | 26 | — | — |
| Binding tests | | | | | | | |
| Application of silica-sol: | | | | | | | |
| Filter tubes | Yes | Yes | No | Yes | Yes | No | Yes |
| Cylindrical joint | Yes | Yes | No | Yes | Yes | No | No |
| Workability | Good | Fair | No good | Good | Good | Good | Good |
| Cracks after solidification at 600° C. | No | Yes | — | No | Yes | Yes | Yes |
| Bending strength after solidification (kg/cm$^2$) | 98 | 77# | — | 88 | 84# | 62# | 74# |
| Overall evaluation | Good | No good | No good | Good | No good | No good | No good |

As described in the foregoing, by using the ceramics binder mixture of the present invention for binding low thermal expansion ceramics such as cordierite ceramics, it is possible to obtain a reliable bound body having high binding strength without formation of cracks at the joint area.

The obtained ceramics binder mixture is suitable for binding low thermal expansion cordierite filters. Further, if the method of binding filter tubes of the present invention is employed, it is possible to bind cordierite filter tubes for which production of a long length product is difficult, whereby a bound filter tube having a substantial practical value which is long, highly reliable and useful for removal of dust from high temperature gasses can be provided.

The bound cordierite filter tubes are suitable for use in a filter apparatus for removing dust from a hot synthesis gas of a coal gasifier and for use in a filter apparatus for removing dust from a combustion gas to be sent to a gas turbine of a power plant utilizing a pressurized fluidized bed combustion boiler. Accordingly, the present invention facilitates practical realization of such next generation coal-utilizing technologies under development, and its contribution to the energy industry will be substantial.

What is claimed is:

1. A ceramics binder mixture having from 4.3 to 7 parts by weight, as calculated as silica, of a silica-sol mixed to 100 parts by weight of a mixture comprising (1) from 25 to 60 parts by weight of cordierite aggregates prepared by melting and vitrifying a mixture of an approximate cordierite composition ($2MgO \cdot 2Al_2O_3 \cdot 5SiO_2$), followed by crystallization to cordierite, and having particle sizes of from 0.1 to 1 mm, (2) from 6 to 17 parts by weight of fumed silica having particle sizes of from 0.1 to 10 μm, and (3) the rest being a powder comprising cordierite particles and having particle sizes smaller than 0.1 mm, whereby the $Na_2O$ content in the binder mixture excluding moisture is not higher than 0.3 wt %.

2. The ceramics binder mixture according to claim 1, which has a mean thermal expansion coefficient of not more than $19 \times 10^{-7}/°C$. between room temperature and 1,000° C. after it was dried, solidified and then fired at 1,300° C.

3. The ceramics binder mixture according to claim 1, wherein ceramics to be bound by the ceramics binder mixture is cordierite ceramics containing at least 50 wt % of cordierite aggregates prepared by melting and vitrifying a mixture of an approximate cordierite composition ($2MgO.Al_2O_3.5SiO_2$), followed by crystallization to cordierite, and having particle sizes of at least 0.1 mm.

* * * * *